UNITED STATES PATENT OFFICE.

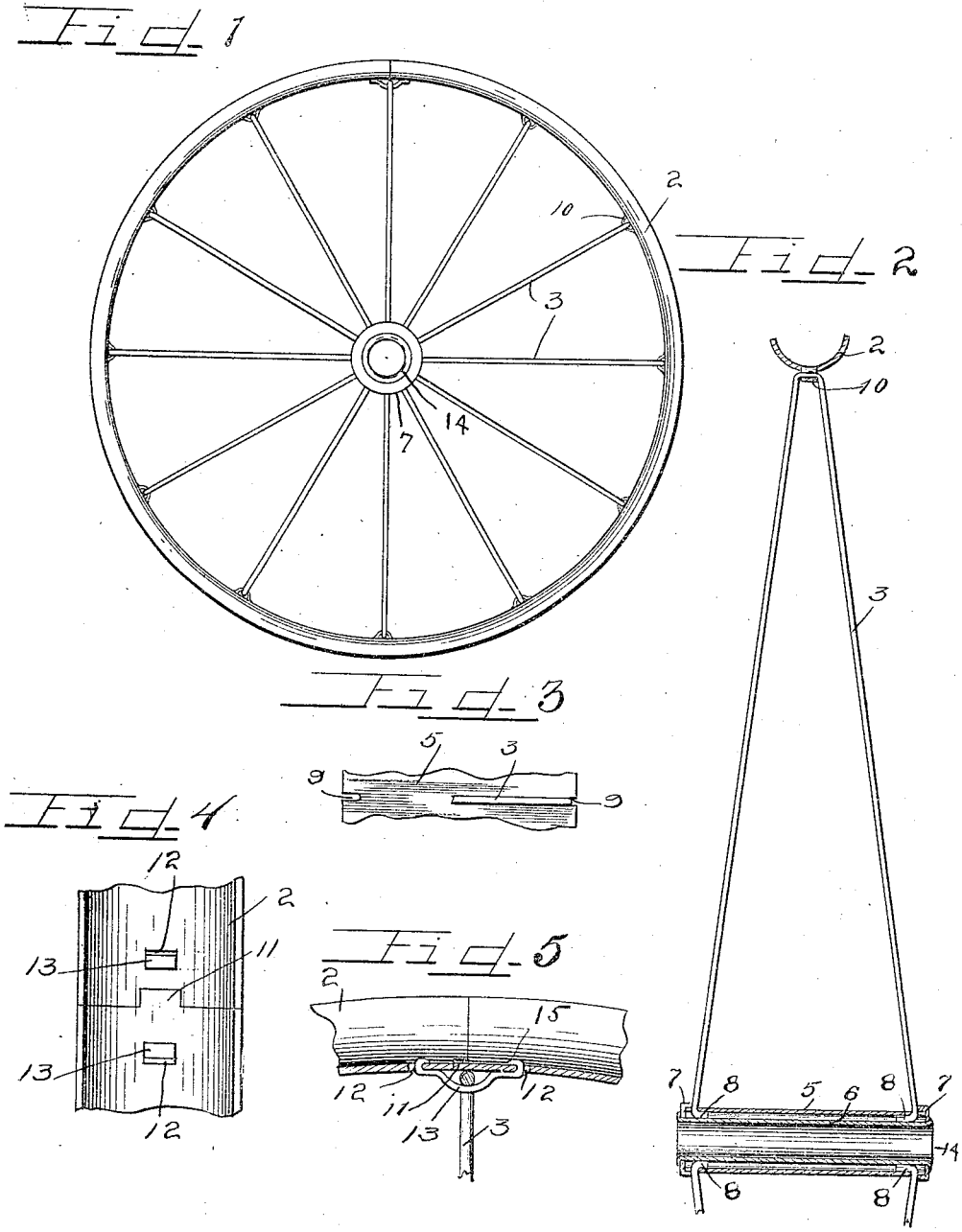

WILLIAM ERASTUS WILLIAMS AND JOHN GRANT, OF CHICAGO, ILLINOIS, ASSIGNORS TO AUTO MACHINE WORKS COMPANY, OF CHICAGO, ILLINOIS, A CORPORATION OF ILLINOIS.

METAL WHEEL.

No. 886,565.  Specification of Letters Patent.  Patented May 5, 1908.

Application filed October 1, 1907. Serial No. 395,430.

*To all whom it may concern:*

Be it known that we, WILLIAM E. WILLIAMS and JOHN GRANT, each a citizen of the United States and a resident of Chicago, county of Cook, State of Illinois, have invented new and useful Improvements in Metal Wheels, of which the following is a specification.

Our invention relates to wheels especially adapted for baby carriages and other light vehicles but usable for heavier work.

The general object of the invention is to provide a serviceable wheel of neat appearance and low cost that may be readily made by automatic machinery.

In the accompanying drawings, Figure 1 shows the wheel in side elevation. Fig. 2 is an axial section of the wheel. Fig. 3 is a detail view showing a portion of the wheel hub. Fig. 4 shows in plan view a certain rim joint. Fig. 5 shows the same joint in section.

The rim, 2, of the wheel is curved in cross section so that it may receive a rubber tire. It is not integral but its ends abut and one is provided with at least one projection 11 to enter a corresponding recess in the other. Strips 10 are punched inwardly at intervals along the medial portion of the rim to form eyes through which spokes may be threaded. The rim joint is at one of the equidistant points where the spokes are to meet the rim, and here instead of an eye 10, there is a clip 13 having its middle bent inward like the eyes, and with its ends passed through apertures 12 in the rim and clenched or bent down snugly upon the body of the rim, thereby holding the ends firmly together as well as in perfect alinement.

The hub consists of an outer tube 5 having notches 9 in each end, a longer and smaller inner tube 6, and annular flanged caps 7. To form the spokes, rods 3 are passed through the eyes of the rim until the middle of each lies in the corresponding eye, the end portions of each are then bent sharply, at the eye, until each branch may lie in one of the notches in the corresponding end of the outer hub tube 5, and each branch is bent sharply inward at such point that the terminal portion may with slight difficulty be pushed into this tube. The spokes being all thus put in position, the inner tube is put in place, its external diameter being such that the ends of the spokes are firmly held between it and the outer sleeve, and the threaded caps 7 are then screwed upon the threaded ends of the inner tube to meet the ends of the outer tube and at the same time to force the spokes firmly against the bottoms of their notches. The ends of the inner tube, which is made long enough for the purpose, are then swaged or spun outwardly over the caps at 14 rigidly and permanently binding the parts together.

It is of course not indispensable that the rim be adapted to receive a round rubber tire, nor that the caps be threaded upon the inner hub tube, nor that the spokes have the two parts in the same place, but the precise construction described is preferred.

What we claim is:

1. In a metal wheel, the combination with a rim, of a cylindrical hub tube notched at each end to receive the spokes, spokes secured to the rim and having their inner end portions lying in the notches, respectively, and bent sharply into contact with the inner surface of said tube, annular caps having peripheral flanges fitting over the ends of the tube and pressing the spokes against the bottoms of their notches, and a cylindrical tube closely fitting the space within the inwardly turned ends of the spokes, extending out through the two annular caps and flanged down upon the latter, binding the parts together rigidly.

2. A discontinuous metal rim having its ends abutting and interlocked combined with a clip extending across the joint, having its middle bent inward to form a spoke receiving eye, and having its ends locked into apertures in the rim ends.

3. In a metal wheel, the combination with a straight outer hub tube with spoke-receiving notches in its ends, of a smaller concentric inner tube projecting beyond the ends of the outer tubes, spokes lying in said notches and bent sharply into the annular space between the tubes, closely fitting therein and forming the only obstructions in the annular space, and heavy annular caps slipped upon the projecting ends of the inner tube and provided with flanges fitting over the notched end portions of the outer tube; said projecting ends being spun or swaged down upon the caps, substantially as set forth.

4. The combination with a hub tube having spoke receiving passages in each end, of a wheel rim having inwardly projecting medial eyes, of spokes having their middle portions in said eyes, respectively, and their end portions passing through said passages and bent sharply to engage the interior of said tube, annular caps fitting over the ends of the tube, and a smaller axial tube rigidly holding said caps and at the same time preventing inward movement of the spokes.

Signed at Chicago, Ill., Sept. 25, 1907.

WILLIAM ERASTUS WILLIAMS.
JOHN GRANT.

Witnesses:
EMIL POEPPEL,
GUST. SCHULZE.